United States Patent [19]

Sailer

[11] 4,410,554

[45] Oct. 18, 1983

[54] SOY PROTEIN PRODUCT AND PROCESS

[75] Inventor: Donald E. Sailer, Fort Wayne, Ind.

[73] Assignee: Central Soya Company, Inc., Fort Wayne, Ind.

[21] Appl. No.: 320,295

[22] Filed: Nov. 12, 1981

[51] Int. Cl.³ .............................................. A23J 1/14
[52] U.S. Cl. .................................. 426/302; 426/656; 426/431; 426/634; 260/123.5
[58] Field of Search ............... 426/656, 431, 436, 309, 426/302, 634; 260/123.5

[56] References Cited

U.S. PATENT DOCUMENTS

| 2,052,215 | 8/1936 | Cohn | 426/431 X |
| 3,126,286 | 3/1964 | Mashy | 426/634 |
| 3,669,677 | 6/1972 | Sair et al. | 426/431 |
| 3,809,767 | 5/1974 | Sair et al. | 260/123.5 X |
| 4,113,716 | 9/1978 | Gomi et al. | 260/123.5 |

Primary Examiner—Kenneth M. Schor
Attorney, Agent, or Firm—Tilton, Fallon, Lungmus & Chestnut

[57] ABSTRACT

A novel aqueous process for the production of soy protein concentrates which possess many of the functional attributes of soy protein isolates.

7 Claims, 1 Drawing Figure

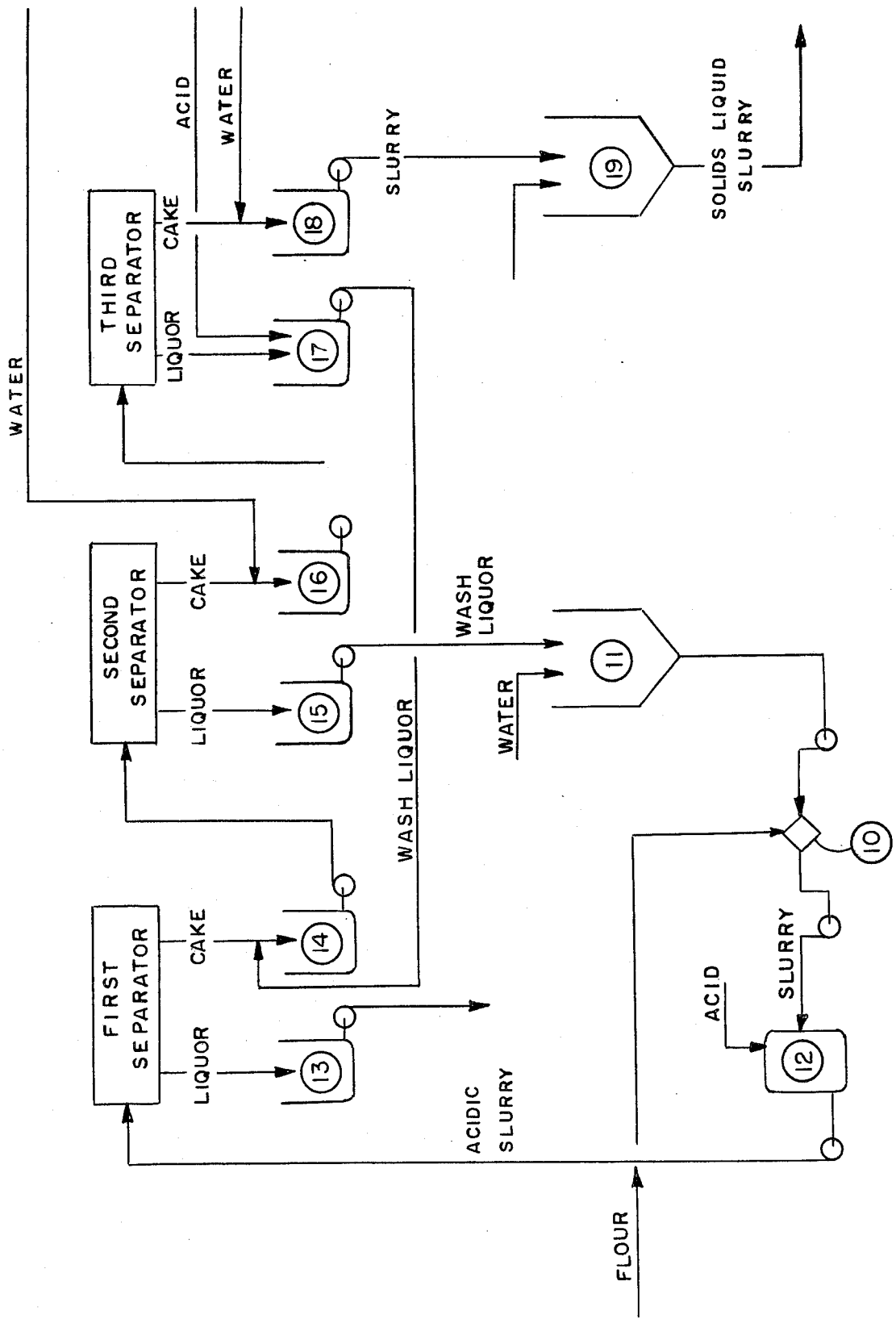

SOY PROTEIN PRODUCT AND PROCESS

BACKGROUND OF INVENTION

This invention relates to an aqueous process for producing soy protein concentrates and, more particularly, to concentrates that possess many of the functional properties of soy protein isolates.

Although food-grade soybean flours and grits have been available since the 1930's, it has been only within the last twenty years that soy protein products have been used at an accelerating rate for the manufacture of processed food. During this period, there has been a proliferation of improved products, including soy protein concentrates (minimum 70% protein), isolates (minimum 90% protein), and textured products.

In most instances, the nutritional quality of a protein ingredient for food is a vital factor. However, in many cases, the functional properties of the ingredient is an over-riding factor since the product must contribute to, or at least not detract from the overall character of the food being processed. This is true of both conventional foods and newly designed foods. All foods, old and new, must conform to some prevalent pattern of consumer acceptability in order to achieve successful commercialization.

In the food field, functionality is a term which refers, in a general sense, to the property or properties of a food ingredient or additive that defines or influences the character of any processed food containing the ingredient or additive. For example, the milk protein or soy protein stabilizes emulsified fat in a whipped topping, and also stabilizes the foam structure when air is incorporated through whipping. The newer soy proteins have been selected and characterized for functional use in processed food items.

The functional character of soy proteins includes properties such as solubility, water adsorption and holding capacity, fat absorption and holding, emulsification, viscosity, gelation, cohesion-adhesion, foaming, flavor binding, and the like. The development of soy protein products with new or, particularly, improved functional properties, has been an ever-increasing challenge.

Soy protein concentrates have been defined as products prepared from defatted soybean source material by removing a preponderance of soluble non-proteinaceous material, and containing a minimum of 70 percent protein (N×6.25) on a moisture-free basis. These products have been commercially available since about 1960.

Prior to the commercial introduction of soy protein concentrates, the only soy protein products available for food use were soy flours and grits (about 50% protein). Concentrates were designed to offer improved nutritional value (higher protein content) and improved functional values, including flavor and odor.

Three basic commercial processes were developed during the late 1950's and early 1960's to provide these concentrates. The common element in these processes is the immobilization of the major protein fraction of the defatted soybean source material in aqueous suspension to permit the removal of soluble low molecular weight materials including sugars, non-protein nitrogenous matter, some minerals, and the like.

In one process, as described in U.S. Pat. No. 2,881,076, acidification of the aqueous solution to the average isoelectric pH of the protein is utilized to immobilize the protein. The low molecular weight materials are then removed by aqueous leaching. In this process, the wet acidic concentrate may be neutralized with food-grade alkali prior to drying. This improves the solubility of the protein.

In another process, the defatted soybean source material is leached with aqueous ethanol to remove the low molecular weight materials (Mustakas, Kirk, and Griffin, J. Am. Oil Chem. Soc. 39, 222, 1962; U.S. Pat. No. 3,365,440). In the third basic process, the protein of the defatted source material is immobilized by steaming prior to the leaching with water (U.S. Pat. No. 3,142,571). Since the early 1960's, modifications of several of these processes have been proposed or commercialized.

The soy protein concentrates possess, in some degree, a number of the functional properties recited above. The kind and degree of these functional properties are dictated by the processing parameters. For example, the aqueous-alcohol process concentrates possess low protein solubility in spite of the fact that their aqueous suspensions are almost neutral in pH. This is a result of protein denaturation by aqueous alcohol and heat in desolventizing. In contrast, the acid-leach concentrates which are neutralized with alkali possess a higher protein solubility.

Although the functional properties of soy protein concentrates are useful in the production of certain processed or manufactured foods, this is a limiting factor in the broader application of these concentrates in the food field. They suffer by comparison to the soy protein isolates as to kind, range, and degree of functional activity. Thus, there has existed a distinct challenge to improve the functional properties of the concentrates to allow replacement of the more expensive isolates in processed foods. All soy protein products have been increasing in cost because of inflationary economic factors, yet it is expected that the differential between concentrates and isolates will continue to widen due to the inherent complexities of isolate processing.

It is apparent that there is a need for soy protein concentrates with greater functionality produced at lower cost relative to the cost of producing soy protein isolates.

SUMMARY OF THE INVENTION

We have found that the acid leach process mentioned earlier can be made to produce a very functional soy protein concentrate if certain newly-discovered critical parameters are adhered to. Further, we have discovered that the combination of these parameters is a critical factor in producing the novel soy protein concentrate. This was unexpected since the process is at least twenty years old with certain antecedents in older art, and undoubtedly, has been examined many times in the intervening years.

In order to define the critical parameters, it is necessary to describe the general elements of the acid-leach process in some detail. Defatted soybean source material, either flour, grits, or flakes, is intimately mixed with acidified water at about pH 4.4 to 4.6 and allowed to leach in order to dissolve soluble matter present in the source material. A significant portion of the aqueous fraction is separated by settling and decantation, filtration, or centrifugation. This step may be repeated one or more times to remove most of the soluble matter. The final step or steps may comprise washing with water which has not been acidified. A variety of acids has been used in the acid-leach step as described in the prior art. These include hydrochloric acid, orthophosphoric acid, sulfur dioxide, and the like. Sulfur dioxide has anti-microbial properties, and materially alters the functionality and properties of the protein. As an alternative to sulfur dioxide, the use of sulfites or bisulfites at some stage of the process has been described in the prior art. Also, mention is made of other additives, presumably oxidizing agents, to reduce or bleach the color of the soy protein concentrate.

The dewatered, moist soy protein concentrate cake may be dried as such or neutralized and dried. The acidic product has a lower protein solubility and a lower functionality in food systems as compared to the neutralized product. The prior art indicates that a diversity of alkalies and alkaline salts can be employed in the neutralization step prior to drying. Sodium and potassium derivatives are to be preferred for higher solubility soy protein concentrate. A variety of dryers has been employed to dry the acid-leach soy protein concentrates. These include oven dryers (moving belt), flash dryers, spray dryers, and fluid bed dryers. Obviously, the physical form of the wet material is an important factor in the choice of a dryer.

We have discovered that a certain combination of parameters or conditions results in a highly functional soy protein concentrate having high protein solubility, high viscosity, good gelling character, excellent fat-emulsification and holding, and high water holding properties. The combination of the discovered parameters includes:

(a) the use of defatted soy flour with high nitrogen solubility, (b) the rapid wetting and aqueous leaching at pH 4.4 to 4.6 under mild temperature conditions, (c) use of hydrochloric acid or phosphoric acid as acidifying agents, (d) avoidance of the use of sulfur dioxide, sulfite, bisulfite, or oxidizing agents, (e) limited time exposure at acidic conditions, (f) neutralization with either sodium or potassium hydroxides, (g) pasteurization at relatively low temperatures, and (h) drying at restricted temperatures.

The details of this novel process combination, and the characterization of the resulting soy protein concentrate are described in conjunction with a schematic flow diagram constituting the drawing hereof.

DETAILED DESCRIPTION OF THE INVENTION

The source material for the preparation of the novel concentrate of this invention is a defatted soybean flour with a Nitrogen Solubility Index (NSI) (American Oil Chemists' Offical Method Ba 11-65) of at least 65, and preferably in the range of 65 to 75. In other words, 65 to 75 percent of the nitrogen present in the flour should be soluble under the conditions of the standard method. Further, a soy flour with a particle size wherein 90 to 95 percent passes through a 200 mesh U.S. Standard screen is preferred.

The defatted soy flour of this type is the source material of choice for several reasons. Because of the fine particle size and the high degree of cell fracturing, the soluble materials of this defatted soy flour leach out very rapidly when the flour is placed in aqueous suspension. In addition, the fine particle size of the flour results in a more finely-divided and uniform end-product, as compared to that derived from defatted grits or defatted flakes as described in prior art.

We have discovered that aqueous acid leaching under mild temperature conditions is necessary and critical for the production of a highly functional concentrate having food-use properties similar to that of a soy protein isolate. Water at a temperature of less than 90° F., and preferably in the range of 60° to 80° F., is employed. Water at higher temperatures results in a diminution of water solubility of the finished concentrate. This is related to a general degradation of all functional values. Water at lower temperatures is not desirable since the diffusion of water-soluble components into the aqueous phase is diminished.

For the necessary rapid aqueous leaching of the defatted soy flour, the flour is mixed with water in any one of several continuous liquid-solid mixing devices. The Waukesha DTL blending unit is but one example of such a device. The ratio of water to defatted soy flour is in the range of 5 to 1 and 10 to 1 on a weight-to-weight basis. The preferred ratio is 8 to 1. After almost instantaneous and continuous blending of flour and water, the effluent, a suspension of soy flour in water, is acidified on a continuous basis to a pH of about 4.4 to 4.6. Food-grade hydrochloric acid is the acid of choice for lowering the pH of the flour-water suspension. Phosphoric acid may also be used. It is imperative that no sulfur dioxide or salts of sulfurous acid be used in this or subsequent processing steps because of their deleterious impact on protein properties, presumably through cleavage of disulfide bonds and re-establishment of new unnatural ones. However, the novelty and scope of this invention is not constrained by any hypothetical theorizing. Acidification is continuously controlled by a pH sensor with a feedback mechanism regulating the flow of acid.

To produce the unique soy protein concentrate of this invention, it is mandatory to restrict the time exposure of the source material to the acidic leaching conditions. It was discovered that with increasing exposure of the defatted soy material to the acidic (pH 4.4 to pH 4.6) conditions, the solubility of the protein at neutral pH declined markedly. Such a decline is detrimental to overall functional properties necessary for use in a wide variety of food systems.

Rapid water washing of the acid-leached defatted soy flour may be accomplished in several ways. One useful way is to separate the leached solids from acidic solution and water wash the leached soy source material in a countercurrent fashion employing two or three stages of separation as exemplified in the drawing and as described below. Although any of several different types of centrifuges may be used for separation of acid-leached cake at the stages, scroll-type centrifuges are eminently satisfactory for this type of operation.

It is to be understood that this invention is not restricted to this mode of rapid separation of acid-treated defatted soy flour from the acidic environment and the washing of the leached defatted soy flour. However, the described countercurrent system offers economy of wash-water volume, and, hence, lower volume of sewer loading or recovery, and, also, conservation of costly energy.

As recited above, the residence time of the defatted soy flour under the acidic conditions, about pH 4.4 to about 4.6 is a critical parameter in the practice of this invention. We have discovered that the time, starting with the blending of the soy flour with the water system to the time that the washed leached cake exits the last of the washing stages, should be no longer than one hour, and preferably thirty to forty-five minutes. Obviously, if a low number of washing stages are employed, the residence time of the leached cake will be shorter, but removal of mineral acid will be less.

We have found in the practice of our discovery that three stages of leached soy flour separation and washing are satisfactory in producing a product with unique properties. This is not to say that other modes of washing are not within the scope of this invention.

A useful system of acid-leaching of defatted soy flour is shown in the drawing and described as follows.

The defatted soy flour enters the system as shown in the lower left. At station 10, it is blended, in continuous manner, with water at about 80° F. and/or wash liquor. These are previously blended in the mixing tank 11. The slurry proceeds to tank 12 where the pH is adjusted from pH 4.4 to about pH 4.6 by an automatic pH control system with hydrochloric acid. It should be pointed out that all tanks in the system are equipped with mixing devices to provide for the blending of all in-coming and out-going liquors.

The acidic slurry from tank 12 is then pumped to the first separator such as a centrifuge wherein the separated liquor is continuously discharged to tank 13, and then to recovery or sewer. The cake is discharged to a tank 14 where it is blended with wash liquor from the last stage of the process. This wash liquor is described below.

The blended slurry from Tank 14 is then pumped to a second separator (centrifuge preferably) for continuous separation with the liquid phase (Tank 15) and/or water at about 80° F. directed to Tank 11 and being used for the wetting of the starting defatted soy flour. The dewatered cake from the second separator is mixed with water at about 90° F. and blended in Tank 16. This slurry is continuously pumped to the third centrifuge or separator where it is separated into liquor and cake. The liquor is mixed with a very small quantity of hydrochloric acid in Tank 17. This is used to dilute the cake from the first stage of separation as in Tank 14. The small amount of acid is useful at this stage to prevent the leached cake pH rising into ranges wherein the protein of the cake becomes sufficiently soluble, leading to unacceptable losses in exiting liquors. The final leached cake issuing from the third separator has a pH over 5.0, but no higher than 6.0. the pH may range from 5.3 up to 5.9. pH's over 6.0 indicate that unnecessary protein losses are occurring through solubilization in "waste" liquors.

The cake from the third separator is slurried with water at about 80° F., and blended in Tank 18 to provide a slurry having more managable viscosity characteristics for further processing. Additional dilution with water may be done in Tank 19 if needed. The solids-liquid slurry issuing from Tank 19 is then ready for further processing.

The solids of the leached slurry are primarily composed of the major soybean protein globulins and the polysaccharides of the soybean. The leaching process removes the soluble sugars, natural mineral matter, soluble nitrogenous constituents, among other minor materials.

The leached slurry exiting at the lower right in the drawing is further processed by neutralization, pasteurization, and spray drying to provide the unique protein concentrate of this invention.

The solids content of the protein concentrate slurry for further processing should be in the range of from about 10 percent to about 16 percent. Low solids content results in excessive drying energy input and a low rate of production. A high solids content results in unwanted protein-protein interactions which detract from functional values.

Neuralization of the slurry is done with an aqueous solution of sodium or potassium hydroxide. Polyvalent alkaline earth hydroxides such as calcium hydroxide result in an unwanted insolubilization of the soy protein. The pH of the slurry is adjusted to be within a range of about 6.5 to about 7.5, and preferably in the range 6.8 to about 7.2.

Pasteurization of the neutralized soy protein concentrate slurry may be carried out by indirect heat or direct steam injection in any one of a number of commercially available devices. Devices with low-shear agitation are preferred since without agitation, protein "bank-on" can occur, seriously reducing the efficiency and effectiveness of the pasteurization process. In one type of unit, automatically controlled neutralization and subsequent pasteurization by direct steam injection are accomplished in a single unit fitted with zones of agitation through which the fluid under process advances.

Pasteurization temperatures to achieve an acceptable microbial profile in the finished soy protein concentrate are dictated by the nature of the equipment employed. In the unit described above, pasteurization was accomplished by direct steam injection with a temperature of 175°±2.5° F. after mixing. This temperature was maintained for 15 minutes prior to delivery of the fluid feed to a spray dryer through a high pressure pump for adequate spray pattern development. Other time-temperature relationships, as influenced by pasteurization, can be readily determined. Time-temperature should not be such that a significant decrease in protein solubility occurs.

After pasteurization, the neutral soy protein concentrate slurry is then pumped to a spray dryer under high pressure to effect atomization through appropriately-sized spray nozzles. The particular type of drying equipment is not a part of this invention, yet the temperature-residence conditions of drying are critical. It is important that the drying equipment be designed for dry powder removal as dried. Vertical spray driers are preferred, but this discovery is not limited thereto.

For obtaining a dry powdered soy protein concentrate with unique functional properties of value in processed foods as described below, we have found that the outlet exhaust temperature of the dryer should preferably be in the range of about 180° F. to about 190° F. to maximize the balance of product functional value and energy conservation.

The spray-dried powdered product may be coated with commercial lecithin or other food-grade surfactants, such as mono- and mono-diglycerides, in a spray blending-mixing device to improve water dispersibility. Such coating-addition should be in the range of about 0.25 to about 0.5 percent and should not exceed about 0.7 percent, because of a deleterious impact upon flavor, a prime requisite for food utilization.

In the foregoing detailed description of the invention process, a three-stage separation process is described. It is obvious that with these teachings of the invention, persons skilled in the art can devise processes wherein more or fewer stages of separation are utilized.

The product produced according to the above described parameters, and newly discovered constraints therein, has unique functional properties of importance in food use, properties not possessed by soy protein concentrates in current marketing channels.

There are a number of tests which characterize the functional properties of food proteins. These are concerned with physico-chemical behaviorisms which have an impact on the character of the food item in which these proteins are incorporated.

A fundamental character of all functional proteins is solubility. Although insoluble proteins demonstrate water-absorption, fat-absorption and the like, the range of functional value is limited. Soluble proteins demonstrate a much broader range of use properties. A critical test of the protein solubility of a protein-containing product is the Nitrogen Solubility Index (American Oil Chemists' Society Official Method, Ba-11-65).

The product of this invention possesses a Nitrogen Solubility Index of 70 or better, as produced, meaning that at least 70 percent of the protein in the soy protein concentrate is soluble in water as determined by the Official Method of the American Oil Chemists' Society (Ba-11-65). The extent of this solubility has a bearing on other functional values described in the following.

Another functional property of soy proteins of value in various food systems is their ability in aqueous dispersion to form gel structures when heated. These structures are three-dimensional networks which entrap moisture, fat, and other food constituents. A critical test for the heat gelation ability of a protein is described by Circle, Meyer, and Whitney in "Rheology of Soy Protein Dispersions. Effect of Heat and Other Factors on Gelation", Cereal Chemistry, 41 157–172 (1964). Therein it was demonstrated that gel formation and gel strength are concentration and temperature dependent. Upon until the present discovery, among all soy protein products for food, only certain commercial neutral soy protein isolates possessed this unique heat-gelling character. Ten percent protein product dispersions were specified as critical for isolates. We have discovered that soy protein concentrates prepared according to this invention forms gels when thirteen percent protein product (N×6.25) dispersions are heated at 100° C. and higher as described in the above cited assay procedure. These gels have viscosities above 5000 poises (Brookfield Viscometer, Helipath device).

Viscosity alone, as recited in the Circle et al reference, is not sufficient to distinguish gels from heavy pastes even when the specified Helipath device is used. Gels possess characteristics which heavy pastes do not. These are:

(a) translucency in varying degrees,
(b) retention of imprint on container features when carefully removed from container,
(c) cuts or slices cleanly, and
(d) tears when pulled apart.

The soy protein concentrates of this invention have these characteristics, whereas conventional or currently produced soy protein concentrates do not.

Moreover, the heat-formed gels of the soy protein concentrates of this invention maintain high viscosity in the presence of salt (NaCl) up to three percent weight per volume. This is important in that salt is a common additive in processed foods, such as chopped, ground, and comminuted meat foods wherein protein additives are used to control fat separation and cooking or frying losses.

High viscosity of dispersions in salt solutions is another important attribute of the soy protein concentrates of this invention. This is demonstrated by the viscosity of twenty percent solids dispersion in two and one half percent salt solution. Viscosities in excess of 20,000 poises are often achieved. High viscosity in salt-containing dispersions is useful in the preparation of finely-chopped meat emulsions for sausage, meatloaf products, and the like, where heavy consistency is desired for ease of handling and processing. In the past, such viscosity has been attained only with certain heated soy protein isolates.

Another valuable functional attribute of protein additives for processed food is their ability to bind water. This ability varies considerably among the various food-grade protein products. This variance applies equally to commercially available soy protein concentrates. A very useful method for measuring water-binding or water holding capacity of protein products was described by Quinn and Patton, "A Practical Measurement of Water Hydration Capacity", Cereal Chemistry, 56, 38–40 (1979). This method is considered superior to older methods which do not account for protein solubility.

We have discovered that the soy protein concentrates produced by the described invention have superior water-binding and water holding characteristics. Utilizing the Quinn and Patton method, which produces results in terms of grams of water bound per gram of sample, we found that our soy protein concentrates had hydration characteristics approaching that of soy protein isolates. For example, currently available soy protein concentrates had holding values ranging from about 2.0 to about 4.0 grams of water bound per gram of sample. The insoluble concentrates had the lowest values, whereas the commercially-available neutral soluble concentrates were at the upper end of the range. In contrast, commercial neutral soy protein isolates had holding values ranging from about 5.5 to 6.5 grams of water bound per gram of sample. We were surprised to discover that the soluble neutral soy protein concentrates demonstrated hydration capacity values in the range of about 5.7 to about 6.0 grams of water bound per gram of sample.

Many processed foods contain protein additives to aid in fat emulsification and emulsion stabilization. A prime example of these processed foods are ground and chopped meat foods including meat patties, coarse and finely chopped sausages, and non-specific meat loaves.

A number of model systems and test food systems have been employed to determine the fat emulsifying capacity and fat emulsion stabilizing activity of protein additives, including soy protein products. See Inklaar and Fourtuin, "Determining and Emulsifying and Emulsion Stabilizing Capacity of Protein Meat Additives", Food Technology, 23, 103–108 (1969).

We have found that a particular model fat emulsion is eminently suitable for rating protein additives as to their emulsifying and emulsion stabilizating activities. This emulsion contains 1 part of the protein product under test, 4 parts of water, and 4 parts of cod (flair or leaf) fat. A small chopper or silent cutter is used to prepare the emulsion. This emulsion test method, as described in detail later herein, on frying sustains a fat or fry-loss which is indicative of the relative ability of the protein products to hold fat in fat-containing ground, chopped, comminuted, or flanked meat systems which are fried before consumption; for example, meat patties, meat balls, ground meat fillings, and the like.

Concentrates prepared according to the present invention demonstrated frying losses in fat emulsions ranging from about 6.5 percent to 10.5 percent, whereas concentrates made by the aqueous or aqueous alcohol processes recited earlier, in comparative emulsions, had frying losses ranging from about 14.0 percent to 19.5 percent. This is very significant in the yield of fried meat foods.

Cold water (28°–40° F.) thickening is another protein-product functional attribute which is important in certain food systems, such as fortified pancake and waffle batters, cookie doughs for depositing, sheet cake doughs, and others. In ten percent aqueous suspensions, the concentrates of this invention possessed viscosities ranging from about 390 to 420 centipoises (Brookfield). Other representative concentrates had viscosities no higher than 100 cps, and ranging to as low as 15 cps.

The following examples illustrate the practice of this invention, and the characterization of products resulting therefrom.

EXAMPLE 1

This example describes a typical process for preparing the unique soy protein concentrate of this invention.

This trial run was carried out in a process equipment set-up such as depicted in the drawing. The process is a continuous one through the acid-leaching and solids washing stages.

A combination of water and/or aqueous effluent from the second stage (tank 15) of aqueous washing was pumped at a rate of 45 gallons per minute (GPM) to a Waukesha DTL liquid-solids blender 10. Simultaneously, defatted untoasted soy flour, SOYAFLUFF-200W (Central Soya Company, Inc.) with a 71% NSI was fed to the Waukesha blender by an Acrison feeder at a rate of 60 pounds per minute. The flour-aqueous mixture weight ratio was calculated to be 1:6. The rapidly blended slurry was then fed to a surge tank 12 equipped with an automatic pH controller with feedback control for the addition of food-grade hydrochloric acid at 35 percent concentration. The pH of the blended slurry was continuously adjusted to a pH of 4.5 in this particular trial. The acidic slurry was then continuously pumped to a P-5400 Sharples scroll centrifuge wherein it was separated into leach liquor in tank 13 and leached cake in tank 14. The liquor was sewered. The rate of pumping to the centrifuge was 55 to 64 GPM.

The leached cake of (solids about 20 to 25 percent) the first separator or stage was diluted continuously in tank 14 with wash liquor from tank 17 associated with the third stage of cake separation. These aqueous washings are slightly acidified with a small amount of hydrochloric acid to a pH of 4.9 to 5.2 in tank 17 to prevent protein solubilization. The slurry was then pumped to the second stage scroll centrifuge and separated into aqueous liquor in tank 15 and cake in tank 16. As indicated above, this aqueous liquor from tank 11 was used in the preparation of the initial flour slurry.

The cake from the second centrifuge stage (tank 16) was slurried therein with 80° F. water added at a rate of 65 to 80 GPM and pumped to the third stage of scroll centrifugation. The wash liquor from this stage was delivered to tank 17 and the cake to tank 18 along with 80° F. water to result in a more managable viscosity. The resulting slurry was then pumped to a 10,000 gallon holding tank 19 for further processing.

Since the process is a continuous one to this point, when balanced, the tanks can be sized to meet the flow requirement.

In this particular trial, the water make-up tank 11 was 10,000 gallons in size, the surge tank 12 for pH adjustment was 3,000 gallons, the six tanks in the centrifuging stages were each 1,000 gallons, and the final holding tank 19 was a 10,000 gallon tank. All thanks and all other equipment in the process were constructed of stainless steel. Each tank was equipped with an efficient, effective agitator.

The device used for the neutralization and pasteurization of the slightly acidic, leached, wet soy protein was a mixing column (Lightnin Mixer Company) constructed with five mixing compartments, each equipped with a zone agitator, all driven by a central shaft. Fluid flow is directed upward. Both the concentrate slurry and food-grade sodium hydroxide (50 percent) were pumped into the bottom chamber at about the same point (about 1 foot from the bottom). The sodium hydroxide was fed by a vari-stroke positive displacement pump, the feed rate of which was controlled by a pH controller whose pH probe was positioned about six inches higher than the hydroxide feed inlet. The set point of the controller was placed to pH 7.1. Steam at about 90 to 100 pounds per square inch (gauge) was injected at the top of the first or bottom chamber for pasteurization. The rate of steam injection was controlled to give a neutral concentrate dispersion of about 175° F. at the top exit of the mixing column. It was estimated that residence time in the mixing column was 15 minutes.

The concentrate dispersion from the top of the mixing column was pumped by a Manton-Gaulin high pressure pump at 7,500 to 8,000 pounds per square inch to a twelve foot diameter vertical spray dryer (De Laval) equipped with a Delevan Swirl SH nozzle with a 0.075 inch orifice. The outlet temperature of the dryer was controlled at 180° F. The dry powder was then spray-blended with fluid lecithin at a calculated level of 0.3 to 0.5 percent, weight basis, and then packed.

Six thousand five hundred pounds were produced in this trial, a yield of 60 percent based on weight of the initial defatted soy flour. Some line losses were experienced in this run.

EXAMPLE 2

The product prepared in Example 1 was analyzed with the following results:

|  | Percent Weight Basis |
|---|---|
| Moisture | 4.4 |
| Protein (N × 6.25), as is | 69.6 |
| Protein (N × 6.25), mfb | 72.8 |
| Crude Fiber | 4.9 |
| Ash | 3.65 |
| pH (1:10 aq. dispersion) | 7.0 |
| Nitrogen Solubility Index | 82.0 |
| Chloroform Extract | 0.42 |

Several competitive soy protein concentrates and a soy protein isolate were analyzed for comparison. The results of this survey are presented in the table below. It should be noted that the product of this invention possesses a Nitrogen Solubility Index approaching that of a soy protein isolate.

| PRODUCT | SOURCE | % MOISTURE | % AS IS PROTEIN | NSI | % ASH | pH |
|---|---|---|---|---|---|---|
| PROMOSOY-100[1] | Central Soya | 4.91 | 66.4 | 2.77 | 6.42 | 6.9 |
| GL-301[1] | Griffith Lab | 4.70 | 69.5 | 23.30 | 3.85 | 6.6 |
| PROMAX[1] | Griffith Lab | 4.50 | 70.1 | 13.70 | 3.64 | 6.3 |
| PROMINE-D[2] | Central Soya | 4.76 | 90.4 | 88.60 | 3.55 | 7.0 |

[1]Commercial Soy Protein Concentrates.
[2]Commercial Soy Protein Isolate.

EXAMPLE 3

As noted in the foregoing exposition, the water-holding capacity of protein products is an important attribute for food systems. The earlier cited method was applied to a product of this invention and to certain other representative concentrates and isolates. The results are recorded below.

| PRODUCT | TYPE[1] | SOURCE | WHC[2] |
|---|---|---|---|
| Present Invention | SPC | — | 5.7 |
| Present Invention | SPC | — | 5.8 |
| PROMOSOY 100 | SPC | Central Soya | 2.2 |
| GL-301 | SPC | Griffith Lab | 3.8 |
| PROMAX | SPC | Griffith Lab | 3.9 |
| PROMINE-D | SPI | Central Soya | 6.3 |
| SUPRO 620T | SPI | Ralston Purina | 6.4 |

[1]SPC — soy protein concentrate;
SPI — soy protein isolate.
[2]Water holding capacity in grams of water bound per gram of sample (as is).

As is evident from this examination, the product of this invention is superior in water holding capacity to several representative commercial soy protein concentrates, and approaches the functional capability of several soy protein isolates.

EXAMPLE 4

Thirteen percent soy protein concentrate dispersions in water were prepared as described by Circle et al. (reference cited earlier). These were canned in No. 1 C-lined cans and heated at 70° C. for one hour and then at 100° C. for thirty minutes. After cooling to room temperature, the viscosities were determined as described in the cited reference. The cans were then resealed and heated at 120° C. for thirty minutes. Viscosities were again determined after the contents of the can came to room temperature (75° to 78° F.).

Similar aqueous dispersions containing three percent salt were prepared and treated in the same fashion.

The results of this examination are listed below:

| VISCOSITIES OF 13% PRODUCT DISPERSIONS[1] | | | |
|---|---|---|---|
| PRODUCT | SOURCE | NO SALT[2] | 3% SALT[2] |
| SPC | Present Invention | 12,200[3] | 14,800[3] |
|  |  | 23,000[3] | 22,000[3] |
| PROMOSOY-100 | Central Soya | 14.9 | 2.3 |
|  |  | — |  |
| GL-301 | Griffith Lab | 2,130 | 6,800 |
|  |  | — |  |
| PROMAX | Griffith Lab | 7,500 | 3,900 |
|  |  | — | 8,400 |

[1]Viscosities are given in poises.
[2]The first figure is that of the dispersion after heating to 100° C.; the second is that after heating to 120° C.
[3]These dispersions exhibited the characteristics expected of a gel rather than a heavy paste; (a) translucence, (b) slices cleanly, (c) tears when pulled apart, and (d) retains the imprint of the container in which it was heated.

These results indicate that the soy protein concentrate of this invention exhibited gel structures far superior to three other commercially-available concentrates. It is important to note that these were equally strong in the presence of salt, an ingredient in many food systems.

EXAMPLE 5

1:4:4 fat emulsions were prepared from the protein concentrate of this invention and from several commercial soy protein concentrates. The purpose of this was to compare fat emulsification and stabilization characteristics.

To prepare the emulsion, 350 grams of protein product, 1,400 grams of water, and 1,400 grams of beef cod fat (flair or leaf fat) were employed. The fat and water were placed in the bowl of a small Hely-Joly chopper or silent cutter. These ingredients were chopped for sixty revolutions and the bowl was scraped down. After another sixty revolutions, the protein was added and chopping was continued for sixty revolutions. The bowl was scraped down again, and the contents were chopped for another sixty revolutions. Additional emulsions were prepared with two percent salt in the water.

The fat emulsion was then immediately stuffed into No. 1 C-lined cans which were then sealed. The sealed cans were then placed at 4° C. and held for twenty-four hours. The cold emulsions were removed carefully from the opened can so as to preserve the cylindrical shape. For the frying-loss or cook-out test, the cold fat emulsion was cut longitudinally. After weighing one half portion, it was placed sliced surface down on an electric skillet heated to 175° C., with no turning. The emulsion section was fired for ten minutes, carefully separated from fry-out liquid, and reweighed. The percentage of fry-loss of cook-out was then calculated.

| | FRY TEST | | |
|---|---|---|---|
| | | % COOK-OUT | |
| PRODUCT | SOURCE | NO SALT | 2% SALT |
| SPC-1[1] | Present Invention | 9.4 | 10.4 |
| SPC-2[1] | Present Invention | 10.4 | 11.6 |
| PSC-3[1] | Present Invention | 6.5 | — |
| PROMOSOY-100[1] | Central Soya | 18.1 | 20.8 |
| PROMAX[1] | Griffith Lab | 19.4 | 20.9 |
| GL-301[1] | Griffith Lab | 14.0 | 15.0 |
| PROMINE-D[2] | Central Soya | 7.2 | 10.2 |

[1]Soy Protein Concentrate.
[2]Soy Protein Isolate.

This work demonstrates that the product of this invention is uniquely superior to available commercial soy protein concentrates in fat holding capacity, and, indeed, is similar in this functional property to an isolate.

It was noted that the fat emulsions prepared from the concentrates of this invention and that of the isolate, PROMINE-D, were different in character than those of the commercial concentrates. The emulsions of the former were moist on the surface, with a gelatinous structured character which tended to tear when pulled apart. This may suggest an oil-in-water system. In contrast, the emulsions of the commercial concentrates were greasy on the surface, suggesting a water-in-oil system.

In addition to the experiment described above, sealed cans of each fat emulsion were heated at 70° F. for one hour and at 100° C. for thirty minutes. The cans were then held overnight at 10° C. Each emulsion was then examined visually for fat separation or fat-capping. No fat-capping occurred in the emulsions containing the concentrates of this invention or the isolate. In contrast, moderate to severe separation occurred in the PROMOSOY-100, PROMAX, and GL-301 emulsions. Even heating at 120° C. for thirty minutes of the fat emulsions containing the herein described novel concentrates resulted in only trace amounts of fat separation.

EXAMPLE 6

In order to test out the functional value of the soy protein concentrate of the present invention, it was used in the preparation of canned chili. For comparison, several commercial soy protein concentrates and soy protein isolates were also used.

The ingredients of the chili were as follows:

| INGREDIENTS | WEIGHT GRAMS | PERCENT |
|---|---|---|
| Beef Trimmings (45% fat) | 908.00 | 40.00 |
| RESPONSE 4320[1] | 68.10 | 3.00 |
| Water | 1122.30 | 49.44 |
| Soy Protein[2] | 9.08 | 4.00 |
| Spice | 8.08 | 3.56 |
| | 2115.56 g. | 100.00% |

[1]A textured soy protein concentrate from Central Soya Company.
[2]Either a soy protein concentrate or a soy protein isolate, as the later recitation of variables indicates.

The meat was ground through a ⅜ inch plate and placed in a steam jacketed Hobart kettle equipped with a scraper-type agitator. The meat was browned until the fat was liquified. The spice was then added, and the mixture was mixed well. The soy protein product was slurried in a minimal amount of water and held for later addition. The remainder of the water was added with continued mixing. The textured concentrate was then added. The mixture was mixed well. Finally, the slurry of soy protein product was added with additional mixing to insure a uniform composition. After this mixing, the chili preparation was heated to 180° F. and held at this temperature for ten minutes with continued mixing. The food product was then canned in No. 1 C-lined cans and retorted at 255° F. for fifty-five minutes. The product was then cooled and refrigerated for up to twenty-four hours.

The thoroughly chilled cans were then opened and weighed. The hardended fat on the surface of each can was carefully scraped off and weighed. The percent of fat-cap was then calculated as follows:

$$\text{Percent Fat-Cap} = \frac{\text{Weight of Surface Fat}}{\text{Weight of Filled can}} \times 100.$$

The results of this testing are summarized in the following table:

| CANNED CHILI SURFACE FAT | | |
|---|---|---|
| PROTEIN PRODUCT | SOURCE | PERCENT SURFACE FAT |
| SPC[1] | Present Invention | 5.22 (4.98–5.92)[3] |
| PROMOSOY-100[1] | Central Soya | 15.25 (13.69–18.17) |
| GL-301[1] | Griffith Lab | 11.73 (11.33–12.18) |
| SUPRO-620T[2] | Ralston Purina | 5.65 (5.37–5.95) |
| CENPRO-DHV[2] | Central Soya | 9.94 (9.48–10.38) |

[1]Soy Protein Concentrate.
[2]Soy Protein Isolate.
[3]Average and range of three cans per variable.

The results summarized above indicate that the concentrate of this invention is superior to two commercial concentrates and one commercial isolate in stabilizing fat in an actual food system. Indeed, it is equal to another commercial isolate, SUPRO-620T, in this functional capability. In general, the novel product of the invention can be characterized by having a Nitrogen Solubility Index of at least about 70%, a heat gelability to provide a viscosity of at least about 5,000 poise, a viscosity maintenance in the presence of 3% sodium chloride, a water holding capacity of at least about 5 grams of water per gram of bound sample, and a frying loss of below about 12%.

Whereas in the foregoing specification we have set forth a detailed description of the embodiments of this invention for a thorough explanation thereof, those skilled in the art will perceive many variations in the details given herein without departing from the spirit and scope of this invention.

I claim:

1. A process for preparing a novel soy protein concentrate having functional properties normally associated with soy protein isolate comprising
    aqueous acid leaching a slurry of finely divided soy flour having a Nitrogen Solubility Index of from about 65 to about 75 percent with a member selected from the class consisting of hydrochloric acid and phosphoric acid and in the absence of sulfur dioxide and the salts of sulfurous acid and at a temperature in the range of about 60° to about 90° F., the water-flour ratio during said acid leaching being in the range of about 5:1 to about 10:1 on a volume-weight basis while limiting the time said flour is in slurry including any washing subsequent to initial separation to less than about one hour, the pH during leaching being in the range of about 4.4 to about 4.6,
    separating the undissolved solids from said slurry to provide a wet cake of concentrate,
    neutralizing said cake once the same has a solids content in the range of about 10% to about 16% with a member selected from the class consisting of sodium hydroxide and potassium hydroxide to a pH in the range of about 6.5 to about 7.5,
    pasteurizing the neutralized cake at a relatively low temperature, and
    drying said cake at a restricted temperature to provide a product having a Nitrogen Solubility Index of at least about 70%, a heat gelability to provide a viscosity of at least about 5,000 poise, with the voscosity level maintained when a heat-formed gel of the concentrate is in the presence of 3% sodium chloride, a water holding ability of at least about 5 grams of bound water per gram of bound sample, and frying losses below about 12% of meat emulsified with said concentrate.

2. The process of claim 1 in which three washing steps are performed on said cake, at least one of said steps being countercurrent.

3. The process of claim 2 in which wash liquor from the third washing step is employed in the first washing step and the wash liquor from the second washing step is employed in the acid leaching of the soy flour.

4. The process of claim 1 in which the soy flour is so sized that at least about 90% passes through a 200 mesh U.S. standard screen.

5. The process of claim 1 in which said neutralizing condition is provided by a member from the class consisting of sodium hydroxide and potassium hydroxide, said neutralizing and pasteurizing conditions being carried out in a vertical mixing column with pasteurization being performed at the bottom thereof.

6. The method of claim 5 in which said drying includes spray drying the effluent from the top of said mixing column, the outlet temperature of the spray dryer being less than about 190° F.

7. The method of claim 6 in which the spray dried product is coated with a surfactant in an amount up to about 0.7% of the weight of the product.

* * * * *